Sept. 8, 1931.  C. H. PETERSON  1,821,985
ANTICLOGGING DEVICE FOR CORN PICKERS
Filed Dec. 9, 1929  2 Sheets-Sheet 1

Inventor
Christ H. Peterson
By M. Talbert Dick
Attorney

Sept. 8, 1931.   C. H. PETERSON   1,821,985
ANTICLOGGING DEVICE FOR CORN PICKERS
Filed Dec. 9, 1929   2 Sheets-Sheet 2

Inventor
Christ H. Peterson
By M. Talbert Lick
Attorney

Patented Sept. 8, 1931

1,821,985

UNITED STATES PATENT OFFICE

CHRIST H. PETERSON, OF LELAND, IOWA

ANTICLOGGING DEVICE FOR CORN PICKERS

Application filed December 9, 1929. Serial No. 412,789.

The principal object of my invention is to provide a device used in combination with a corn picker that eliminates the tendency of corn pickers to clog up with cornstalk and ears at the upper ends of the snapping rolls, thereby making the corn picker more efficient and eliminating the danger of injury to the operator in manually clearing the clogged condition.

A further object of this invention is to provide a device for eliminating clogging conditions in corn pickers that is easily installed and requires little power to operate it, once it is installed.

A still further object of my invention is to provide an anti-clogging device for corn pickers that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims and illustrated in the accompanying drawings, in which:

Figure 1:
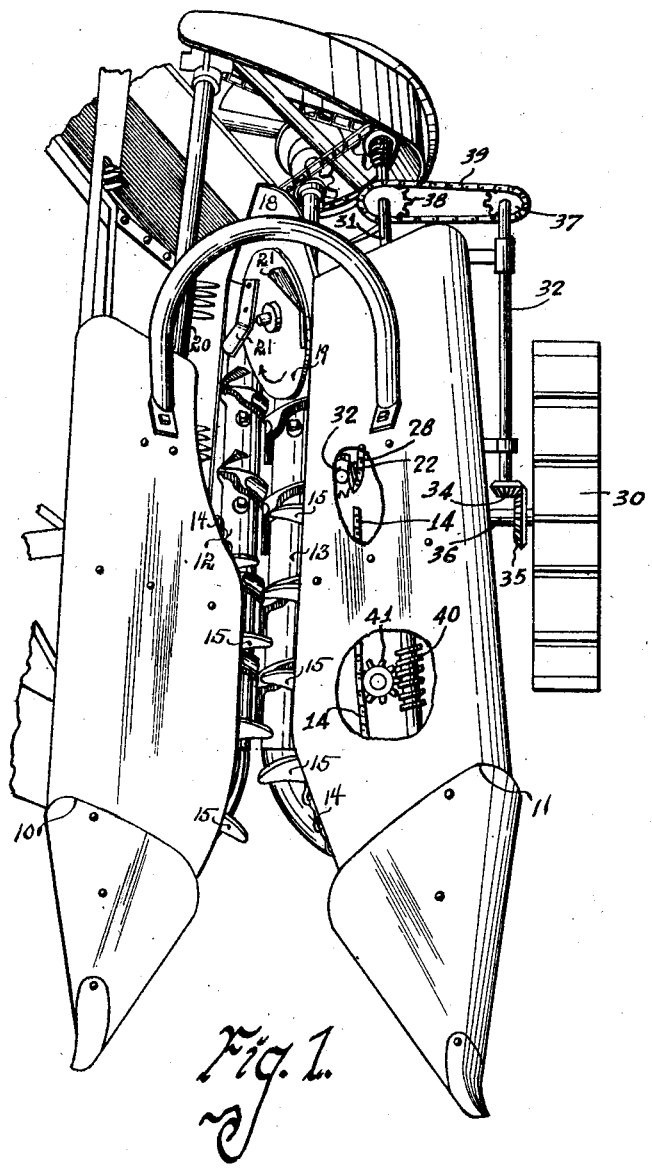
Fig. 1 is a perspective view of a portion of a corn picker with my invention installed thereon and ready for use.
Figure 2:
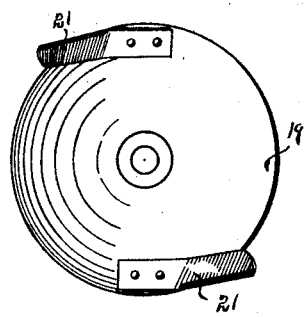
Fig. 2 is a front view of my anti-clogging disk and knives secured thereto.
Figure 3:
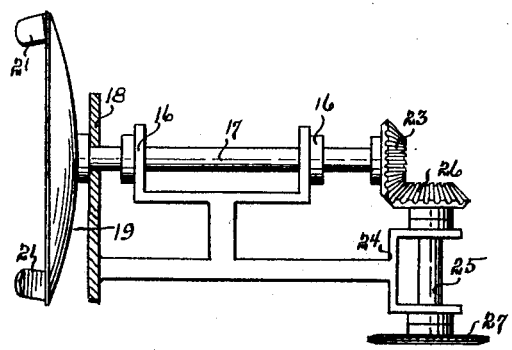
Fig. 3 is a side view of the invention showing the gears for obtaining running power from the corn picker on which it is installed.
Figure 4:
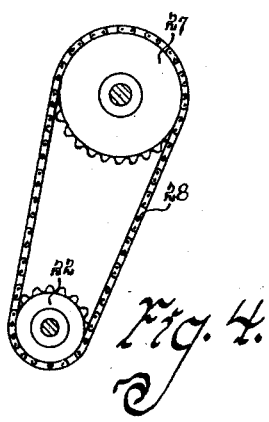
Fig. 4 is a top plan view of the chain operatively connecting the device to the corn picker.

One of the chief disadvantages to corn pickers now on the market is that they clog very often near the rear ends of the snapping rolls. When this occurs, the clogged condition must first be manually eliminated by the operator before the corn picker will function successfully. These undesired experiences are not only a great loss in time, efficiency and labor, but injuries to hands and feet of the operators attempting to clear the stoppage are numerous. I have overcome this objection in corn pickers as will be appreciated by those familiar with the art.

I have used the numerals 10 and 11 to designate the two spaced apart shoes and guiding shields of the common and well known corn pickers. Below each of the shields is a snapping roll, which I have designated by the numerals 12 and 13. Just above each snapping roll is an endless gathering chain 14 mounted on suitable sprocket wheels 32 operatively connected to the power traction wheel of the corn picker. These two chains each carry cornstalk and ear engaging lugs 15. Practically all corn pickers follow this construction but with immaterial changes my invention will function successfully on any of the better corn pickers now being sold to the general public.

The numeral 16 designates a bearing member which may be secured by any suitable means to the corn picker and near the rear ends of the snapping rolls. Rotatably mounted in this bearing member is the shaft 17 extending through the end guide plate 18 of the corn picker. Secured on the inner end of the shaft 17 against relative rotation thereto is my concave disk member 19 having its concave face toward the ear elevator belt 20. It should here be noted that the shaft 17 is so positioned that the disk 19 will have its lower marginal edge cutting a path just above the space between the two snapping rolls 12 and 13 and due to the fact that the disk 19 is at a slight angle to the longitudinal axes of the snapping rolls, the path cut by the disk 19 will extend at its forward point from a position over the snapping roll 13 to a position over the snapping roll 12. Secured by suitable means on the concave side of the disk 19 is a plurality of cutting blades 21 having their leading edges sharpened. These cutting blades extend outwardly and have their forward ends curved to nearer a horizontal plane when they are at the bottom of the circular path they cut by the rotation of the concave disk member 19. By having the top of the disk 19 set back slightly from the vertical the marginal edge of the disk 19 and blades 21 will cut a path completely across the space between the snapping rolls and as the rotation of the disk 19 is downwardly and toward the snapping roll 13, the disk 19 and cutting blades 21 will not only cut off any cornstalks and ears that have clogged at the rear end of the snapping rolls but will guide and move the material so cut into and onto the elevator chute of the corn picker thereby eliminating any possibility of a clogged condition at the rear end of the snapping rolls.

The numeral 22 designates a second sprocket wheel rigidly secured to one of the upper sprocket wheels 32, as shown in Fig. 1.

On the outer end of the shaft 17 I have secured the bevel gear 23. The numeral 24 designates a second bearing member secured to the corn picker rotatably mounted in which is the short shaft 25. Secured on one end of the shaft 25 is the bevel gear 26 and secured on its other end is the sprocket wheel 27. Embracing the sprocket wheel 27 and the drive sprocket wheel 22 is the endless chain 28.

I have used the numeral 30 to illustrate a traction wheel which is operatively connected to the rotatably mounted shaft 31 of the corn picker. This is accomplished by a shaft 32 rotatably mounted on the corn picker having a bevel gear 34 in operative engagement with the bevel gear 35 on the traction wheel shaft 36. The numeral 37 designates a sprocket gear on the shaft 32 and the numeral 38 designates a similar sprocket gear on the shaft 31. The numeral 39 designates an endless chain embracing the sprocket gears 37 and 38. Rigidly secured on the shaft 31 is a worm gear 40 in engagement with the rotatably mounted gear 41 which is also in engagement with the chain 14, as shown in Fig. 1. By this arrangement, when the corn picker is being pulled over the ground the traction wheel 30 will be operatively connected to the endless chain shown in Fig. 1 and as this endless chain is operatively connected to the sprocket gear 22, the disk 19 will be rotating in the proper direction for the clearing of the corn picker of undesirable congestions.

With the installation of my invention a corn picker will function continuously in any type of corn without undesirable clogging at the rear ends of the snapping rolls thereby eliminating waste of corn, time and labor, as well as eliminating the possibility of injury to the operator in attempting to clear stoppages with his hands or feet.

Some changes may be made in the construction and arrangement of my improved combination anti-clogging device for corn pickers without departing from the real spirit and purpose of my invention, and it is my intention to cover by my claims any modified forms of structure or use of mechanical equivalents which may be reasonably included within their scope.

I claim:

1. In combination with a corn picker having snapping rolls, a disk rotatably mounted above the snapping rolls and cutting a path across the space between said snapping rolls for clearing the same of clogged material, and a means for operatively connecting said disk to the traction power wheel of said corn picker.

2. In combination with a corn picker having snapping rolls, a concave disk rotatably mounted above said snapping rolls and cutting a path across the space between said snapping rolls, and gears for operatively connecting said disk to the operating power of said corn picker.

3. In combination with a corn picker having snapping rolls, a disk rotatably mounted above said snapping rolls, a means for operatively connecting said disk with the operating power of said corn picker, and a plurality of cutting blades secured to said disk.

4. In combination with a corn picker having snapping rolls, a disk rotatably mounted above said snapping rolls, a means for operatively connecting said disk with the operating power of said corn picker, and a plurality of curved cutting blades secured to said disk.

5. In combination with a corn picker having snapping rolls, a concave disk rotatably mounted above the rear end portions of said snapping rolls, and so positioned as to cut a path from a point above the outside snapping roll to a point above the inside snapping roll. curved blades secured to the concave side of said disk, and a means for rotating said disk when said corn picker is in operation.

CHRIST H. PETERSON.